United States Patent
Van Cai

(10) Patent No.: US 8,948,303 B1
(45) Date of Patent: Feb. 3, 2015

(54) COMMUNICATION DEVICE AND METHOD OF CREST FACTOR REDUCTION USING AMPLITUDE COMPRESSION

(71) Applicant: Microelectronics Technology Inc., Hsinchu (TW)

(72) Inventor: Khiem Van Cai, Brea (CA)

(73) Assignee: Microelectronics Technology Inc., Hsinchu (TW)

( * ) Notice: Subject to any disclaimer, the term of this patent is extended or adjusted under 35 U.S.C. 154(b) by 0 days.

(21) Appl. No.: 14/083,363

(22) Filed: Nov. 18, 2013

(51) Int. Cl.
  *H04K 1/02* (2006.01)
  *H04L 25/03* (2006.01)
  *H04L 25/49* (2006.01)
  *H04B 1/66* (2006.01)

(52) U.S. Cl.
  CPC .......................................... *H04B 1/66* (2013.01)
  USPC ............................................ 375/297; 375/296

(58) Field of Classification Search
  USPC ....................................................... 375/297
  See application file for complete search history.

(56) References Cited

U.S. PATENT DOCUMENTS

| | | | |
|---|---|---|---|
| 7,239,257 B1* | 7/2007 | Alexander et al. | 341/138 |
| 7,308,041 B1* | 12/2007 | Schrader et al. | 375/296 |
| 2003/0108214 A1* | 6/2003 | Brennan et al. | 381/94.7 |
| 2004/0218689 A1* | 11/2004 | Akhtman | 375/296 |
| 2005/0181754 A1* | 8/2005 | Wu et al. | 455/251.1 |
| 2008/0095284 A1* | 4/2008 | Hori et al. | 375/350 |
| 2009/0180527 A1* | 7/2009 | Asami | 375/226 |
| 2012/0281786 A1* | 11/2012 | Lindemann et al. | 375/297 |
| 2014/0192913 A1* | 7/2014 | Bogdan | 375/260 |

* cited by examiner

*Primary Examiner* — Erin File
(74) *Attorney, Agent, or Firm* — Novak Druce Connolly Bove + Quigg LLP

(57) ABSTRACT

A method of crest factor reduction using amplitude compression for multi carrier signals. Major elements of the intermodulation distortion caused by amplitude suppression are removed to be outside of the desired signal band, and the peak amplitude is compressed, thus producing a signal with lower peak to average ratio for a required maximum error vector magnitude.

12 Claims, 15 Drawing Sheets

COMMUNICATION DEVICE AND METHOD OF CREST FACTOR REDUCTION USING AMPLITUDE COMPRESSION

BACKGROUND

1. Technical Field

Embodiments of the present disclosure relate to signal processing, and more particularly to systems and devices and a method of crest factor reduction utilizing amplitude gain compression.

2. Description of Related Art

Modern communication systems use wideband transmission waveforms that contain multiple carriers and/or sub carriers. These transmission waveforms are not constant in amplitude, but can have very fast amplitude variations wherein the peak amplitude is substantially larger than the root mean square (rms) amplitude. The multi carrier signal is transmitted using a multi carrier power amplifier (MCPA) to transmit the signal at a very high efficiency, while maintaining acceptable signal quality and a high adjacent channel power ratio to meet the spectral emission mask requirements.

To maximize efficiency of a power amplifier (PA), it is desirable to transmit the signal near the saturation power levels $P_{SAT}$. However, if the peak amplitude of the signal reaches $P_{SAT}$ then the signal will suffer distortion which may accumulate to cause high inter-modulation distortion. As the levels of inter-modulation distortion may be very high, the digital pre-distortion may fail to fully correct the amplitude distortion, and the inter-modulation (IMD) may be higher than that allowed by the required spectral emission mask.

To avoid this problem, the signal may be transmitted at lower levels to avoid the peak signal reaching $P_{SAT}$. But this simple back-off approach results in lower PA efficiency, which is a key performance parameter.

DETAILED DESCRIPTION

The disclosure is illustrated by way of example and not by way of limitation in the accompanying drawings in which like references indicate similar elements. Various embodiments illustrate different features of the disclosure. It should be noted that references to "an" or "one" embodiment in this disclosure are not necessarily to the same embodiment, and such references can mean "at least one." Descriptions of components in the embodiments are given for the purpose of illustrating rather than limiting.

An electronic device can comprise an MCPA transmission system. The proposed CFR method compresses the peak amplitudes of signals in the CFR processor 12. Embodiments of systems, devices, and CFR methods using amplitude compression are given. The disclosed systems and communication devices may be implemented as standalone devices, or integrated into various network gateway devices or network terminal devices. The various network gateway devices comprise base stations, bridges, routers, switches, or hot spots or access points for wireless networking. The network terminal devices comprise set-top boxes, cell phones, tablet personal computers, laptop computers, multimedia player, digital cameras, personal digital assistants, navigation devices, or mobile internet devices.

A multi-carrier combiner 11 combines multiple carriers on a common spectrum, wherein each carrier has an gain of $\gamma_i$ at a frequency $f_i$ to produce a composite signal expressed as follows:

$$y(t) = \sum_{i=1}^{Nc} \gamma_i x_i(t) \cdot e^{j2\pi f_i t}$$

wherein $\gamma_i$ and $f_i$ are the carrier gain and frequency of the individual carrier, respectively with a subscript of variable i, and $N_c$ is a total number of the multiple carriers.

Figure 1:
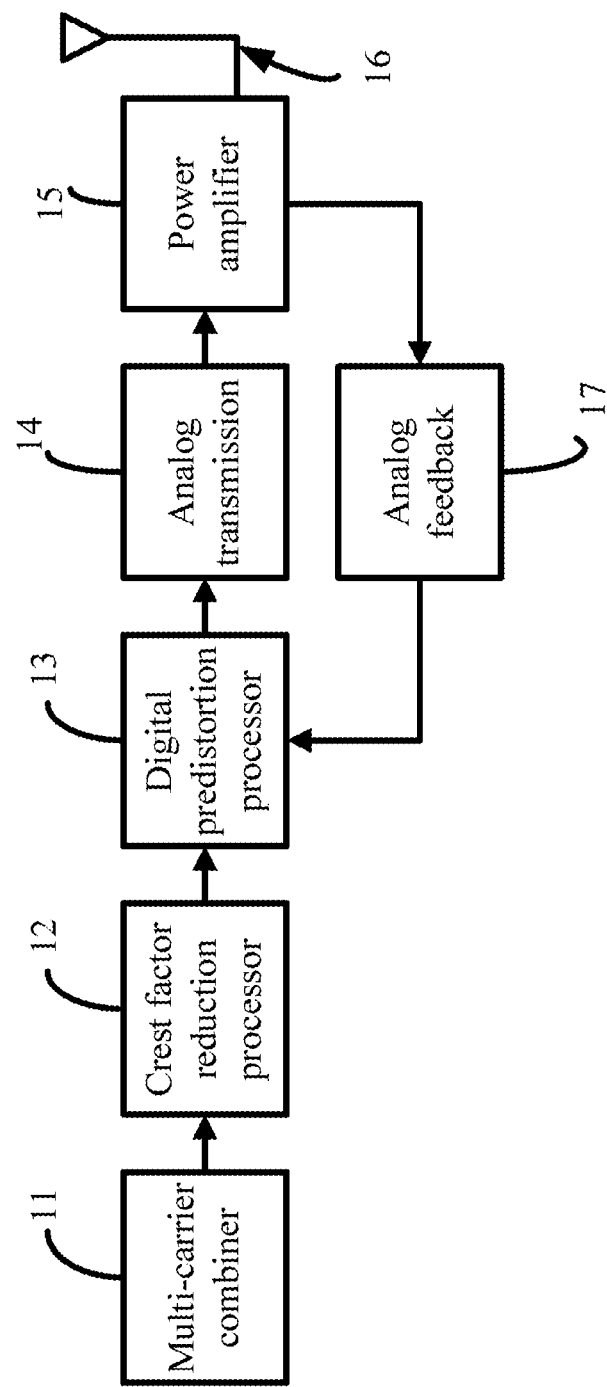
FIG. 1 is a block diagram of one embodiment of an electronic device with crest factor reduction (CFR) processor.

The process of CFR reduces the PAR or crest factor of the multi-carrier signal in the digital domain, and the resulting out-of-band IMD is then filtered by a digital filter. FIG. 1 shows a typical wireless communication system with a CFR processing block 12.

A digital predistortion processor 13 performs digital pre-distortion on signals outputted by the CFR processor 12 to compensate for distortion which may be caused by a power amplifier 15 based on feedback provided by an analog feedback unit 17. The digital predistortion processor 13 transmits post predistortion signals to the power amplifier 15 through an analog transmission unit 14.

Figure 2:
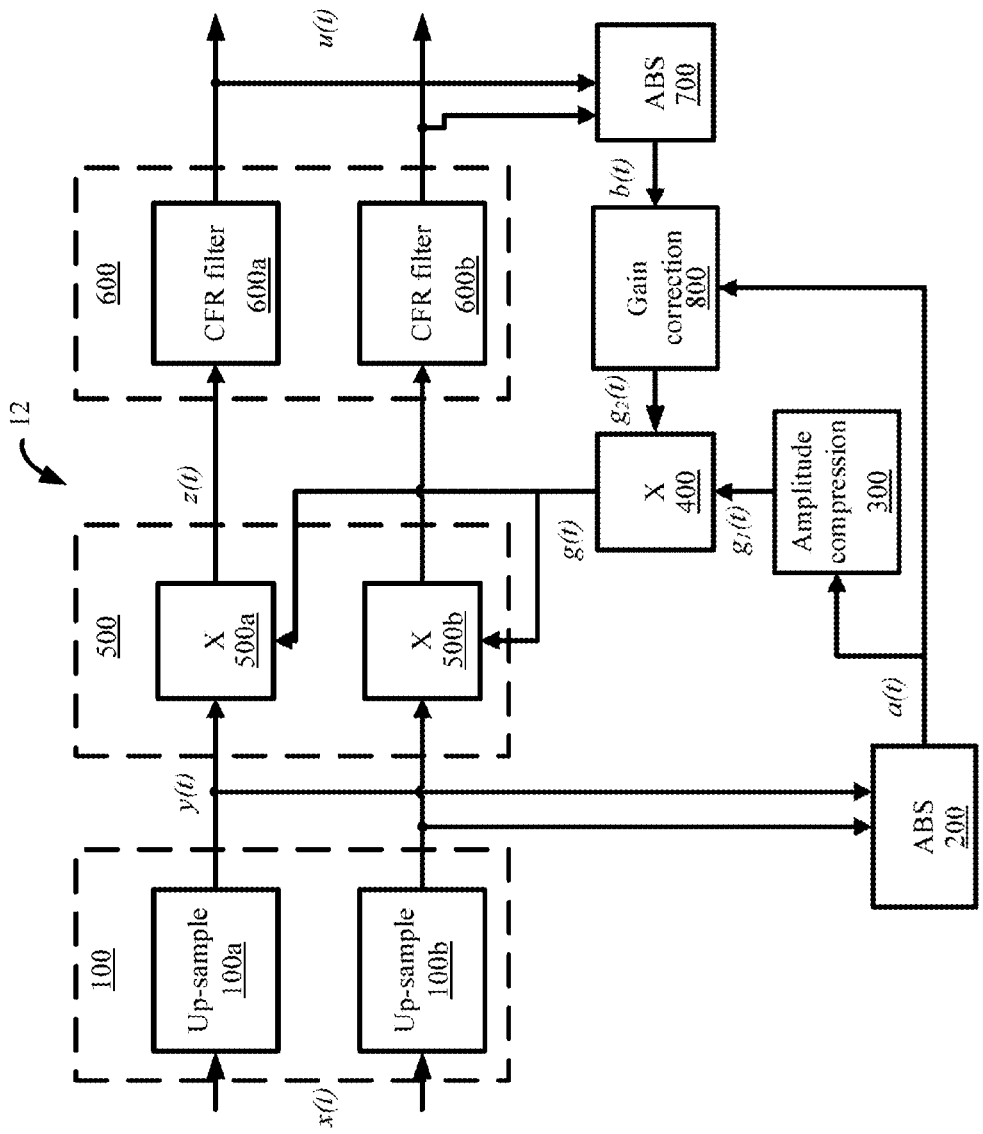
FIG. 2. is a block diagram of one embodiment of a CFR processor with gain compression.

With reference to FIG. 2, one embodiment of functional blocks of the CFR processor 12 are shown. An up-sampler 100 receives the complex input signal x(t) at sampling rate $R_s$ and up samples the complex input signal x(t) to produce the up-sampled signal y(t) of sampling rate $M \cdot R_s$, that is larger than the instantaneous bandwidth of the complex input signal x(t). M is an integer from two to four. The up-sampler 100 comprises up-samplers 100a and 100b for respectively up sampling real and imaginary components I and Q of the complex input signal x(t) to the sampling rate $M \cdot R_s$, and accordingly generates components I and Q of the up-sampled signal y(t). An absolute value processor 200 computes the amplitude signal a(t) of the signal x(t) which is sent to the amplitude compressor 300, which can be a processor or a look-up table (LUT), to generate the compressed gain $g_1(t)$. A gain correction unit 800 generates a correction gain $g_2(t)$ based on a absolute value of signal u(t) which is provided by an absolute value processor 700 from output u(t) of the CFR filter 600. The correction gain $g_2(t)$, referred to as gain correction factor, is provided to maintain a smooth and constant power gain through the CFR processor 12. A multiplier 400 multiplies the gain $g_1(t)$ with a correction gain $g_2(t)$ to obtain a gain signal g(t) to compensate for any resulting gain error which occurs in the amplitude compressor 300. The correction gain $g_2(t)$ can be programmed with a narrow bandwidth to slowly adjust for this error. The gain signal g(t) is then multiplied with I and Q components of the signal y(t) by a multiplier 500 to produce the gain compressed signal z(t) that is sent to a CFR filter 600 to remove the inter-modulation distortion and/or spectral glitches. This signal u(t) output by the CFR filter 600 is nearly the same as the input signal x(t), but at a higher sampling rate and with very much lower PAR.

Block 100 Up-Sampler:

The up-sampler 100 is operable to up-sample the multi-carrier signal x(t) having a sampling rate of $R_s$ by a factor of M, to produce the output signal y(t) having the sampling rate $M \cdot R_s$. This up-sampling has two main purposes:

(1) to prevent aliasing of the noise caused by the subsequent amplitude compression from being folded back into the bandwidth of the fundamental signals, which would increase the error vector magnitude (EVM). The inter-modulation distortion products that are not aliased will be filtered without increasing the EVM; and (2) to prevent the signal from overshooting, such as the Gibb's phenomenon, at the signal transitions, which may increase the PAR. The higher the up-sampling factor M, the lower the resulting EVM, and the lower the PAR which can be achieved for a given required minimum EVM.

Figure 3:
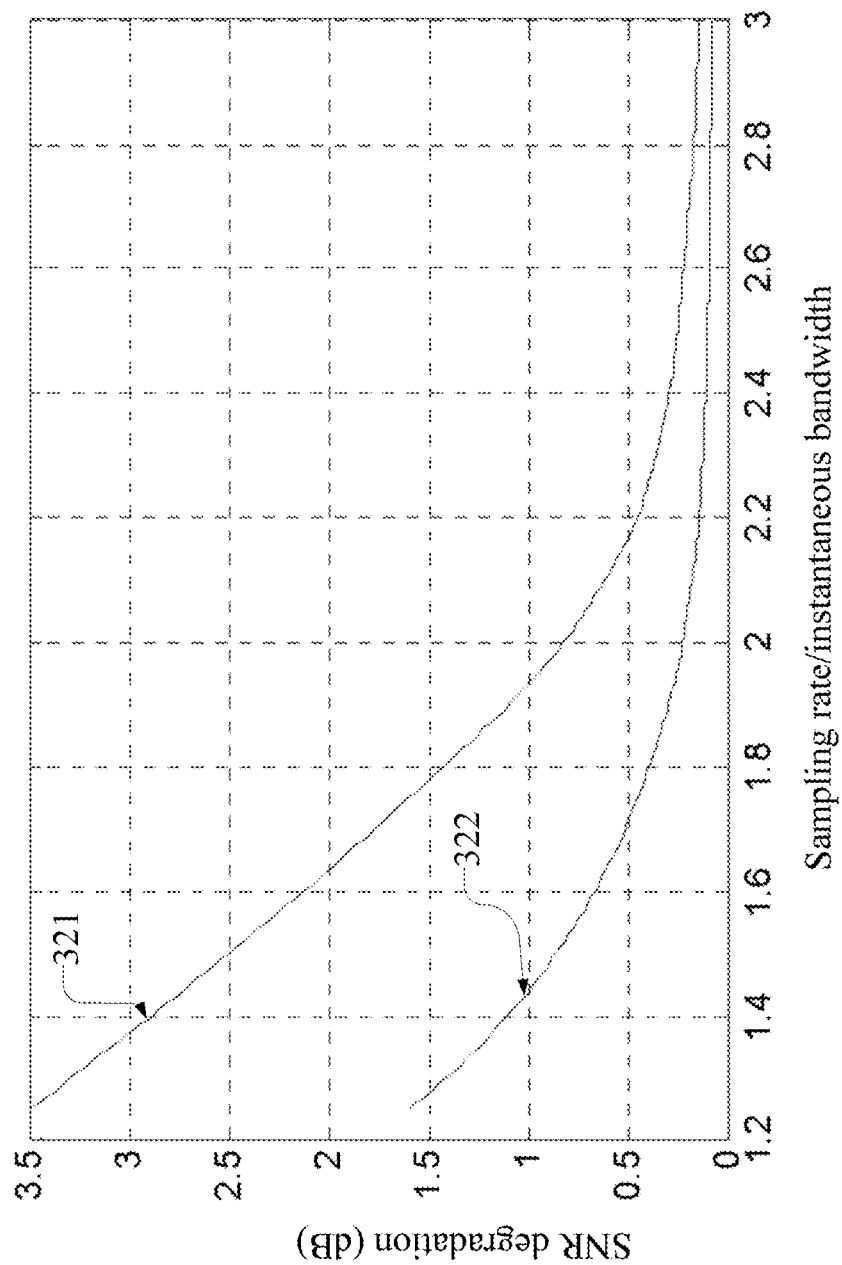
FIG. 3. is a diagram showing signal-to-noise ratio (SNR) degradation versus the ratio of the compression bandwidth over the instantaneous bandwidth.

The signal x(t) will typically have a sampling rate $R_s$ that is slightly higher than the Nyquist sampling rate. The up-sampling by M will generate the signal y(t) having a sampling rate of $M \cdot R_s$. It is desirable to have the sampling rate $M \cdot R_s$ to be about 2 to 3 times the signal bandwidth of the signal x(t) in order to reduce the undesired IMD from folding back to the fundamental signal bandwidth. FIG. 3 shows the signal-to-noise ratio (SNR) degradation versus the ratio of the compression bandwidth over the instantaneous signal bandwidth. A curve 321 represents SNR degradation for split carriers, and curve 322 represents SNR degradation for contiguous carriers.

This implies that the higher the bandwidth the lower the signal degradation due to aliasing. However, increasing the bandwidth increases the complexity, especially in the CFR filter 600.

Block 200 Compute Input Amplitude

The absolute value processor 200 is designed to compute the amplitude of the input signal:

$$a(t) = |x(t)| = \sqrt{I_x(t)^2 + Q_x(t)^2} \quad (1)$$

the variables $I_x$ and $Q_X$ are respectively the I and Q components of the signal x(t).

Block 300 amplitude compression processing:

The special amplitude compressor 300 is operable to suppress the amplitude in a fashion that minimizes the in-band distortion, and also minimizes the sample regrowth in the subsequent filter process.

The amplitude compressor 300 executes an amplitude compression method that computes the compression gain $g_1(t)$ based on the amplitude a(t), The method of computing $g_1(t)$ based on a(t) and generating the desired amplitude is shown in Table 1, wherein the amplitude signal a(t) is abbreviated as "a", and "c" represents a desired amplitude of the signal a(t):

TABLE 1

Amplitude compression zones and features

| Zone | Input Amplitude | Desired Amplitude | Compression Gain | Note |
|---|---|---|---|---|
| Z1 | $0 < a < T_1$ | c = a | $g_1 = 1$ | Keep the signal undistorted to avoid error |
| Z2 | $T_1 < a < T_2$ | $c = T_1$ | $g_1 = T_1/a$ | Clip the signal to amplitude $T_1$ to minimize distortion for signal that is not very large |
| Z3 | $T_2 < a$ | $c < T_1$ | $g_1 < T_1/a$ | Compress the signal amplitude in a way such that the higher the input amplitude, the lower the output amplitude |

Figure 6:
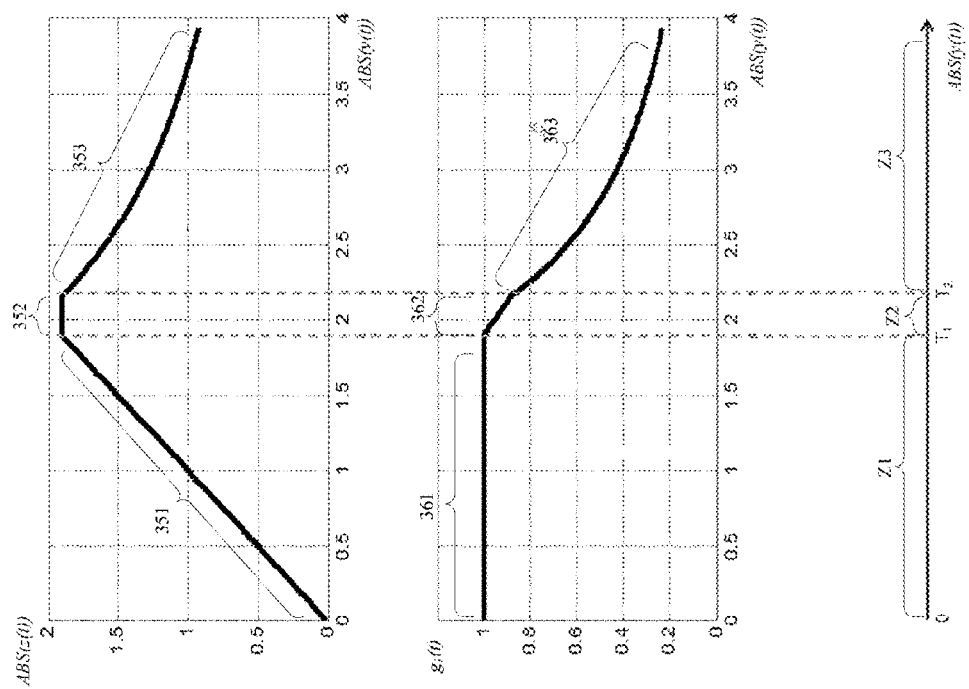
FIG. 6. is a diagram showing compression profile and gain profile of the method.

In Zone Z1, because the amplitude and the phase are unchanged, no distortion will occur, there is no EVM degradation for this section of the transfer function, and the PAR is unchanged. Referring to FIG. 6, $g_1(t)$ comprises a segment 361 associated with ABS(y(t)) in zone Z1 to generate a segment 351 of ABS(z(t)) in zone Z1. ABS( ) is a function which yields the absolute value. ABS(y(t)) is a function which yields the absolute value of the input y(t), and ABS(z(t)) is a function which yields the absolute value of the input z(t).

In Zone Z2, a very small amplitude range is limited to $T_1$, and some low-level distortion will occur. If $T_2$ and $T_1$ are kept close to each other, very small changes of the EVM and PAR result. Referring to FIG. 6, the function $g_1(t)$ comprises a segment 362 associated with ABS(y(t)) in zone Z2 to generate a segment 352 of ABS(z(t)) in zone Z2.

Figure 4:
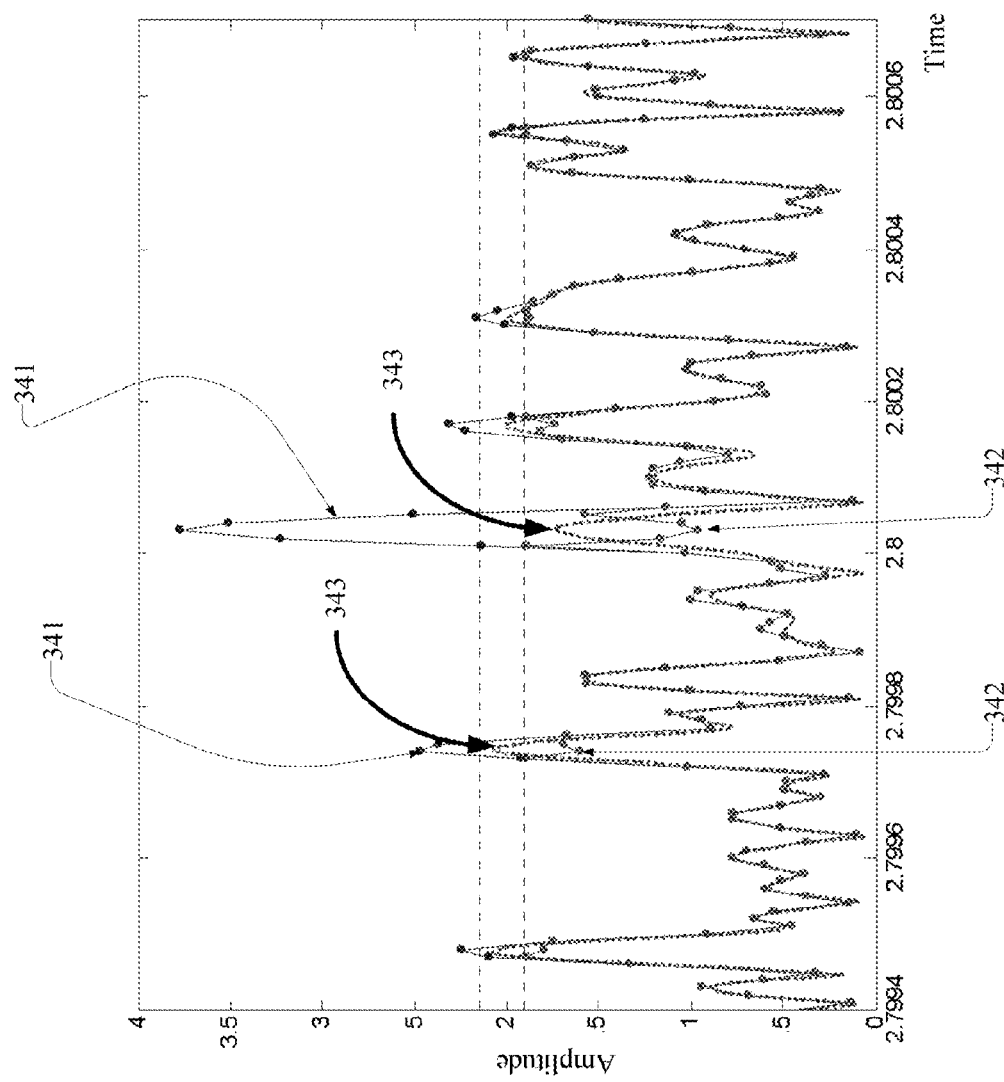
FIG. 4. is a diagram showing raw signal and resultant characteristics of the amplitude compressed signal.
Figure 5:
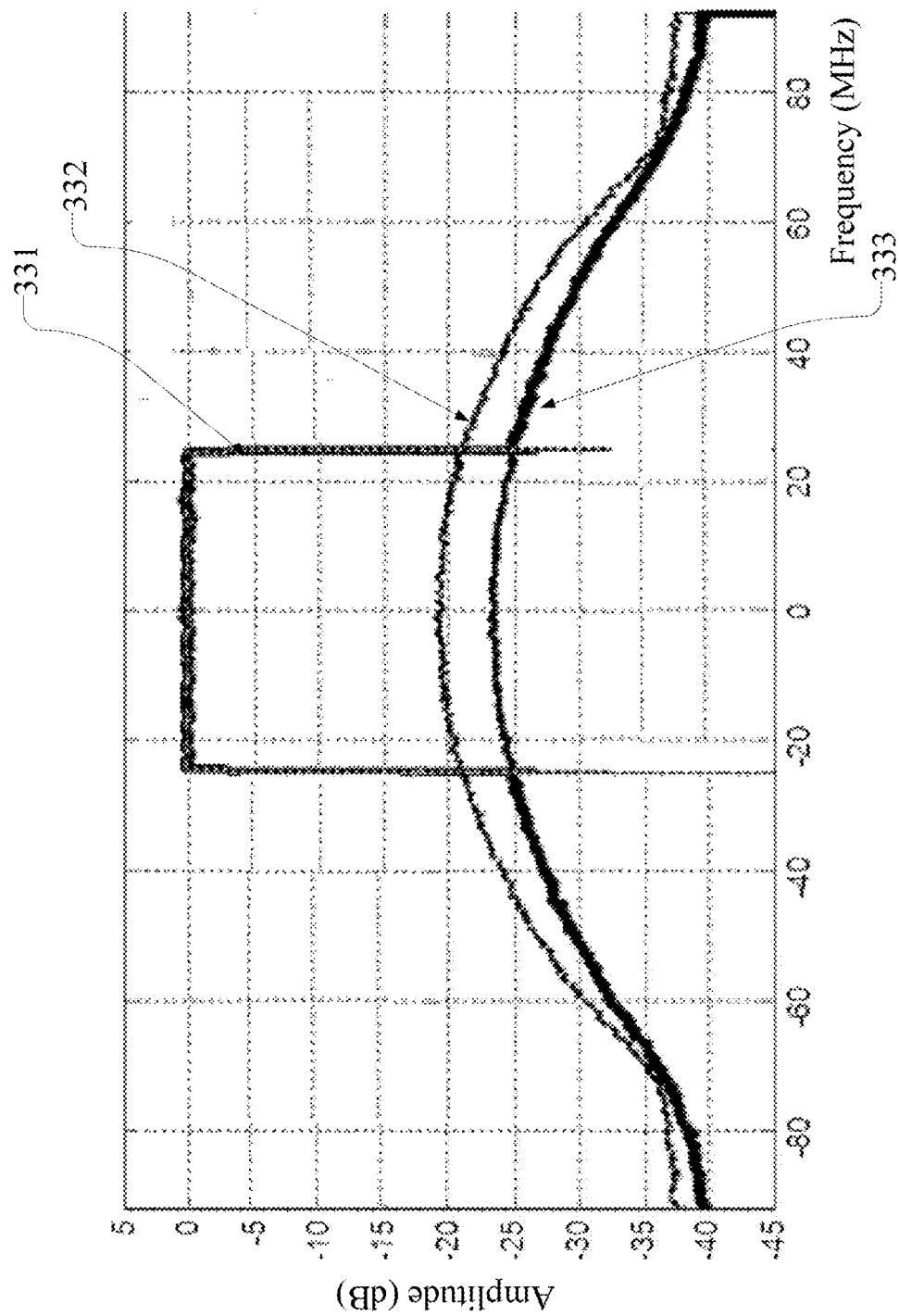
FIG. 5. is a diagram showing spectrum of the amplitude compression in comparison with spectrum of amplitude clipping when CFR output has a peak to average ratio (PAR)=6.65 dB.

In Zone Z3, the large signal is compressed in a gradually heavier fashion, that is, the larger the signal amplitude, the heavier the compression which is applied. Referring to FIG. 6, the function $g_1(t)$ comprises a segment 363 associated with ABS(y(t)) in zone Z3 to generate a segment 353 of ABS(z(t)) in zone Z3. With large over-sampling ratios M, the PAR is maintained at low levels, but significant signal distortion will begin to occur. As the signal amplitude of the samples increases, the heavy compression drops the output amplitude samples downward, and a significant amount of the resulting distortion spectral energy density is placed outside of the desired spectrum, which will allow it to be filtered out to remove the out-of-band distortion, thus resulting in a lower EVM. This effect is illustrated in FIG. 4 and FIG. 5. In FIG. 4, a curve 341 represents an example of the signal y(t), a curve 342 represents an example of the output signal of the multiplier 500, and a curve 343 represents an example of the output signal of the filter 600. In FIG. 5, a line 331 represents a desired signal, a curve 332 represents IMD generated by amplitude clipping, and a curve 333 represents IMD generated by amplitude compression. The method of amplitude compression generates a wider band IMD that can be filtered out.

The compression gain $g_1(a)$ is a function of the amplitude $a(t)$ and can be generalized by the formulation of a non-linear function that will minimize the PAR for a given EVM, and this function can be searched for the optimum non-linear gain function (or profile) that will be unity gain in Zone 1, about 1/a gain in Zone 2, and increasingly hard compression in Zone 3. The function $g_1(a)$ can be modeled as a function that yields the desired EVM, and have the lowest PAR. The function $g_1(a)$ can be represented as a polynomial or a polynomial ratio:

$$g_1(a) = \frac{p(a)}{q(a)} = \frac{\sum_{i=1}^{m} p_i a^{i-1}}{\sum_{i=1}^{n} q_i a^{i-1}} \quad (2)$$

The variables p(a) and q(a) are two polynomial functions of amplitude "a" with order m−1 and n−1 respectively, and m, n, $p_i$ and $q_i$ are the polynomial coefficients selected to yield the desired EVM with the lowest PAR.

Alternatively, the function $g_1(t) = f(a(t))$ may be implemented as a look-up table (LUT). This gain function or profile can be stored in an LUT for use in the actual allocation of the gain compression.

The LUT may comprise L pairs of amplitude and gain points according to the function $g_1(t) = f(a(t))$, and with different scale methods as summarized in Table 2.

TABLE 2

Gain Compression Options

| Option | Amplitude Scale $a_i$ | Gain Scale $g_i$ |
|---|---|---|
| 1 | Scalar | Scalar |
| 2 | Scalar | dB |
| 3 | dB | Scalar |
| 4 | dB | dB |

As a possible illustration without loss of generality, for Option 1, the method to process the amplitude gain compression is as follows:

Step 1: initiate with L1 amplitude thresholds $T_i$, wherein the "i" is an integer variable ranging from 1 to L1, that is i=1, 2, . . . , or L1 in decibels (dB) above the RMS of the signal level, wherein $$T_1 < T_2 < T_3 < T_4 < \ldots < T_{L1} \quad (3)$$

Figure 7:
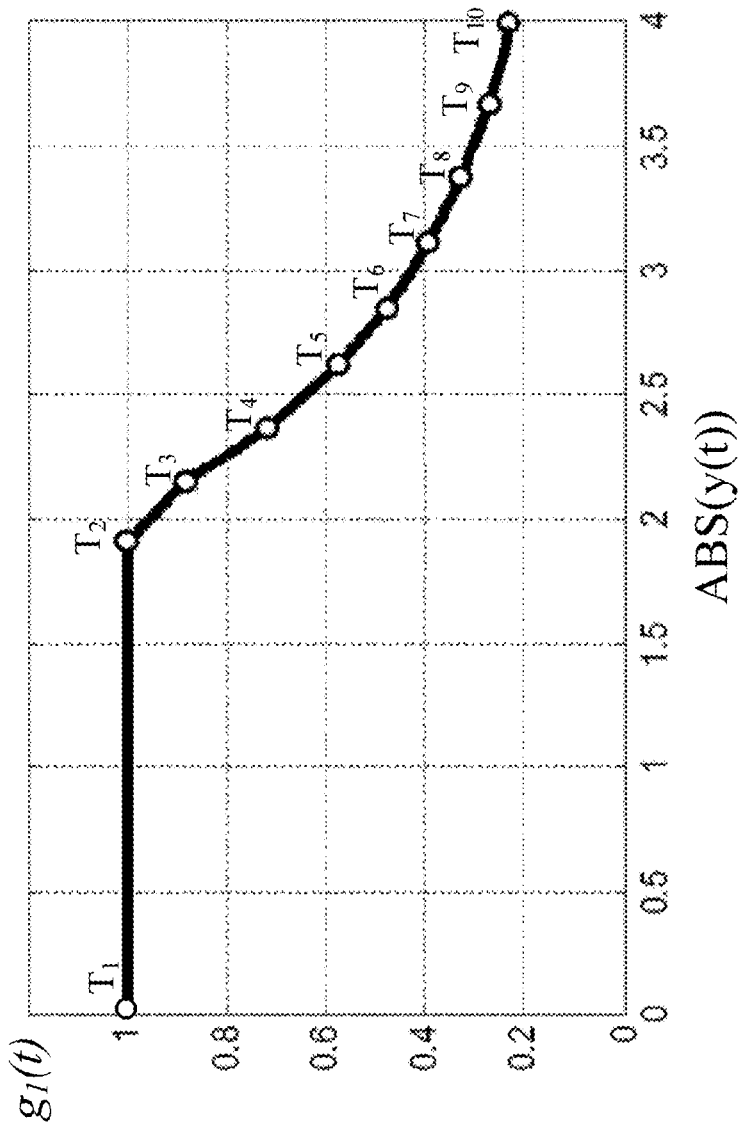
FIG. 7. is a diagram showing a scheme of generating lookup table (LUT) for gain profile.

These amplitude thresholds do not have to be equally spaced, and $T_1$ and $T_{L1}$ are respectively the smallest and largest possible values of a(t) in dB. FIG. 7 shows an example of a gain function where L1=10, and each point T on the gain function represents an amplitude gain pair $(T_i, g_i)$, and $\{(T_i, g_i)\}$ represents a set of amplitude gain pairs. A set illustrated in the following description is enclosed by a curly bracket "{ }."

Step 2: select the gain set $g_i$ in dB corresponding to $T_i$ as shown in FIG. 7.

Step 3: perform interpolation of the L1 pairs $\{(T_i, g_i)\}$ using linear interpolation, log-based or loglog-based interpolation, or any other non-linear interpolation method to create a larger set of amplitude gain pairs $\{(aa_i, gg_i)\}$, i=1:L2 (L2 is the number of points in this interpolation) wherein $aa_i$ is one of a plurality of equally spaced signal amplitudes with small step sizes in FIG. 7, and $gg_i$ is a gain value.

Step 4: convert $aa_i$ and $gg_i$ into a linear scale:

$$aa_i = 10^{\frac{a_i}{20}} \quad (4)$$

$$gg_i = 10^{\frac{g_i}{20}} \quad (5)$$

Step 5: create L3 samples in the LUT. The interpolation is repeated to provide $\{(aaa_i, ggg_i)\}$, where i=1:L3, in which $aaa_i$ covers the range of the signal amplitude and are uniformly spaced with very small step sizes. Typically L3 minimizes the quantization noise by about 1000, $0 = aaa_1 > aaa_2 > aaa_3 \ldots > \ldots >$, $aaa_{L2} = $ Max (amplitude), $(aaa_{i+1} - aaa_i) = \Delta aaa = $ Max (amplitude)/(L3−1), and $ggg_i$ is a gain value being the interpolated gain value in the interpolation process.

Step 6: store $\{(aaa_i, ggg_i)\}$ in an LUT, referred to as a compression gain LUT, where $aaa_i$ is used to address the LUT and $ggg_i$ are gain values outputted by the LUT.

Step 7: for a value a(t), the processor finds the closest location $a_i$ that is smaller than a(t) in the compression gain LUT.

Step 8: based on the LUT, the amplitude compression processor computes the value $g_1(t)$ via linear interpolation, such as:

$$g_1(t) = g_i + \frac{(g_{i+1} - g_i)}{\Delta a}(a(t) - a_i) \quad (6)$$

wherein $\Delta a = (a_{i+1} - a_i)$ (7)

Step 9: apply $g_1(t)$ for input amplitude a(t).

Table 2 shows 3 different gain compression options. For Option 1, the conversions (4) and (5) in Step 4 are skipped. For Option 2, conversion (4) in Step 4 is skipped. For Option 3 conversion (5) in Step 4 is skipped.

To obtain the best performance of the amplitude compression for CFR, the value needs to be determined empirically. One method is by searching by adjusting $T_i$ and $g_i$ until the lowest PAR at complementary cumulative distribution function (CCDF)=$10^{-6}$ is achieved with a given EVM.

Block 400 Amplitude Multiplier:

The multiplier 400 multiplies gain $g_1(t)$ with the gain correction $g_2(t)$ to generate gain g(t) according to equation (8), to perform signal amplitude compression:

$$g(t) = g_1(t) \cdot g_2(t) \quad (8)$$

wherein $g_1(t)$ is the gain value extracted from the gain compression LUT, and $g_2(t)$ is the correction gain value (>1), to compensate for the signal rms power loss due to peak amplitude compression.

Block 500 Signal Multiplier:

The signal multiplier obtains signal z(t) by multiplying signal y(t) with the gain g(t) to perform signal amplitude compression $$z_I(t) = g(t) y_I(t) \quad (9)$$

$$z_Q(t) = g(t) y_Q(t) \quad (10)$$

A signal in the formulas (9) and (10), such as one of $z_I(t)$, $z_Q(t)$, $y_Q(t)$, and $y_I(t)$, have subscripts I and Q which respectively represent I and Q components of the signal, such as z(t) or y(t). This signal compression reduces the I and Q samples with the same gain g(t), thus keeping the phase constant, and only suppresses the high amplitude signals as defined by the gain LUT profile. This eliminates the phase distortion in the peak limiting process, and consequently the EVM is not reduced by this factor.

Block 600 Crest Factor Reduction Filter:

The CFR filter 600 suppresses the undesired IMD outside of the fundamental carriers. This process can be accomplished by various approaches.

First approach: composite multi carrier filter.

Figure 8:
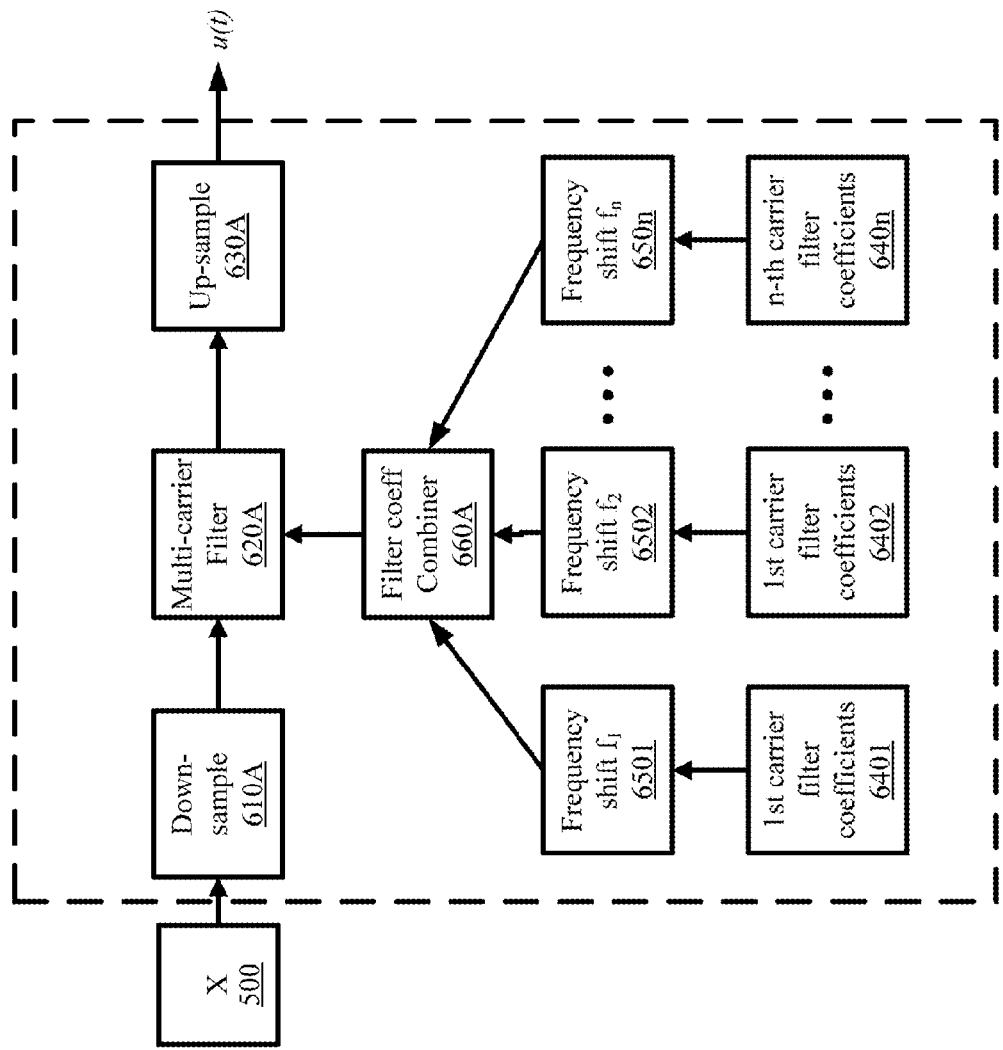
FIG. 8. is a block diagram of one embodiment of a composite multi-carrier filter.

The first approach comprises down-sampling the signal z(t) to a lower sampling rate, performing multi-carrier finite impulse response (FIR) filtering on the down-sampled signal, and then up-sampling the filtered signal to the desired sampling rate to generate a signal u(t). The block diagram of this filter is shown in FIG. 8. A down-sampler 610A connected to the multiplier 500 down-samples the signal z(t) to a lower sampling rate to generate down-sampled signal z(t). A multi-carrier filter 620A performs multi-carrier finite impulse response (FIR) filtering on the down-sampled signal z(t) to generate a filtered signal z(t). A up-sampler 630A up-samples the filtered signal z(t) to the desired sampling rate to generate a signal u(t). A filter coefficient combiner 660A obtains a composite multi-carrier filter coefficient by adding the multiple coefficients 6621, 6622, . . . and 662n together from individual filters each of which comprise a frequency shifter, such as one of frequency shifters 6611, 6612, . . . and 661n respectively providing frequency shift values $f_1, f_2, \ldots$ and $f_n$.

One disadvantage of this filter is that if the signal is decimated by a large ratio then there are large signal overshoots in the multi-carrier filter output because the ratio of the sampling rate over the occupied bandwidth is low. This would result in a high PAR. However, if the down sampling ratio K is small, then the complexity of the multi-carrier filter is large in terms of the required number of coefficients. A second approach outlined below can help with this compromise.

Second approach: multi carrier sub-band CFR filter.

The signal z(t) is the composite of many carriers, each at different center frequency, bandwidth, and different transition bandwidth requirements, as tabulated in Table 3.

TABLE 3

Multiple carriers of the composite signal y(t)

| Signal # | Center Frequency | Bandwidth | Transition Bandwidth |
|---|---|---|---|
| 1 | $f_1$ | $B_1$ | $\Delta f_1$ |
| 2 | $f_2$ | $B_2$ | $\Delta f_2$ |
| 3 | $f_3$ | $B_3$ | $\Delta f_3$ |
| ... | | | |
| Nc | $f_{Nc}$ | $B_{Nc}$ | $\Delta f_{Nc}$ |

Figure 9:
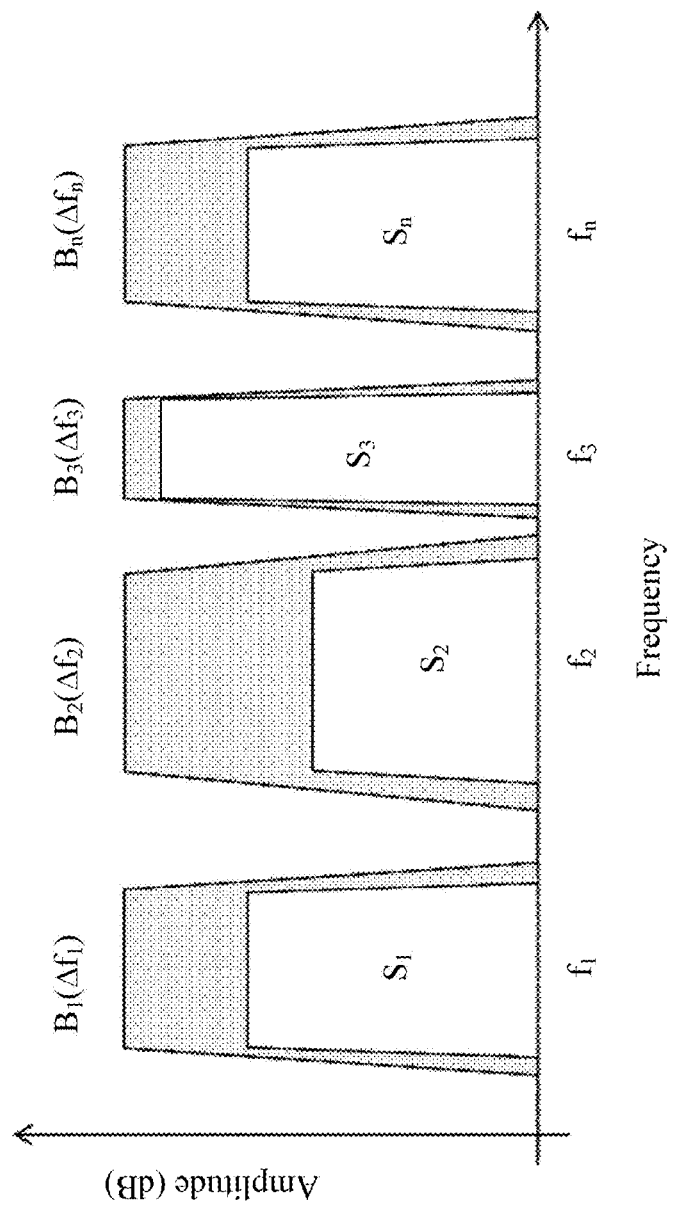
FIG. 9. is a diagram showing a signal spectrum of the multiple carrier signal x(t) which is similar to those of y(t) and z(t)
Figure 10:
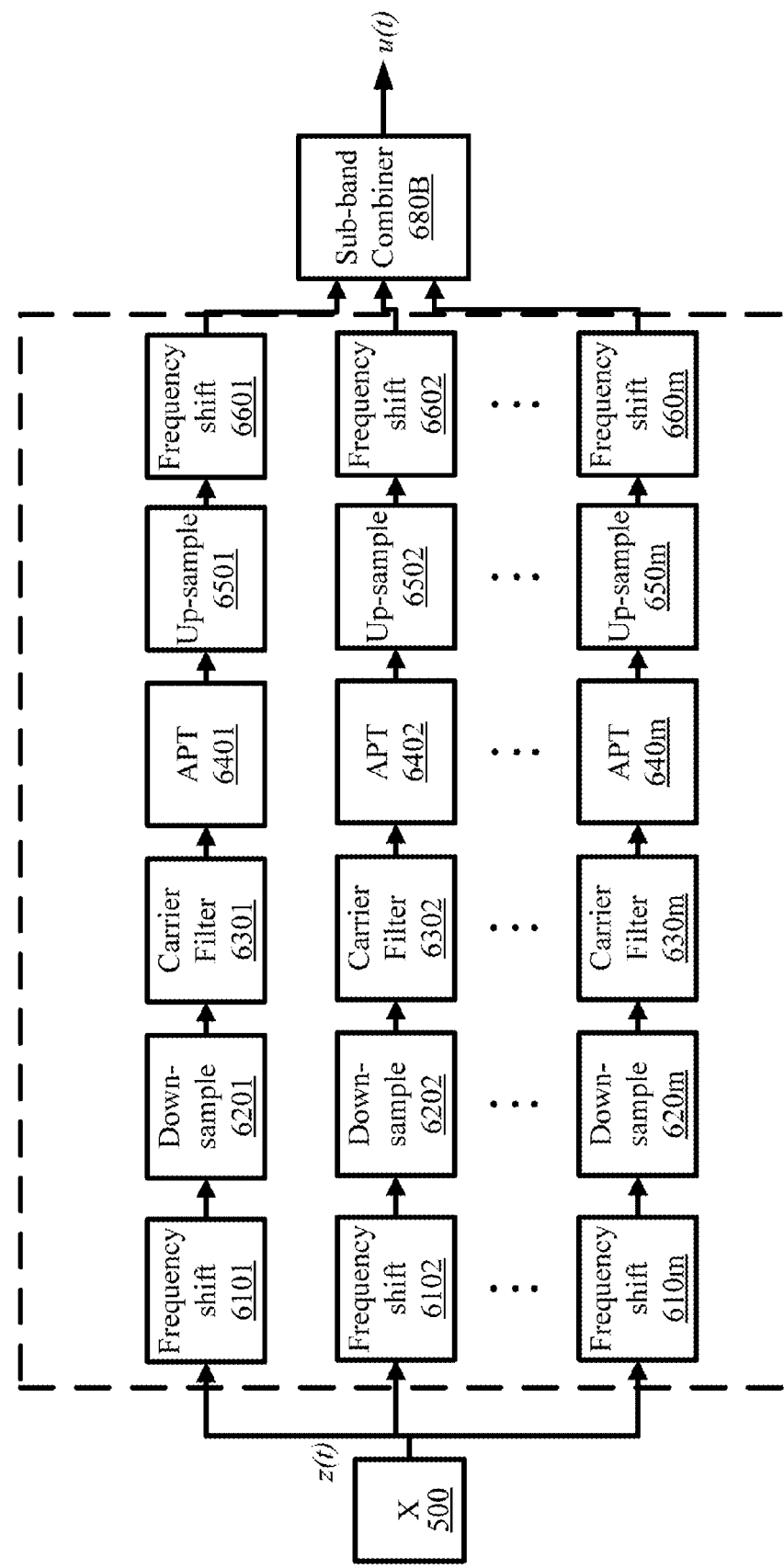
FIG. 10 shows a block diagram of one embodiment of the multi-carrier sub-band CFR Filter.

The spectrum of the multi-carrier signal z(t) is as shown in FIG. 9, where each of $S_1$, $S_2$, $S_3$, and $S_n$, represents a carrier. FIG. 10 shows the block diagram of the multi-carrier sub-band CFR filter.

Referring to FIG. 10, the multi-carrier sub-band CFR filter 600 converts each carrier $S_i$ to baseband via a numerically controlled oscillator (NCO). Each sub-band of the carrier signal is frequency shifted by a first frequency shifter, down-sampled by a down-sampler, filtered by a carrier filter, and receives an amplitude/phase/time (APT) correction by an APT processor, up-sampling by an up-sampler, and is frequency shifted by a second frequency shifter. The first frequency shifter may comprise one of the frequency shifters 6101, 6102, . . . and 610m. The carrier signal is down-sampled by a down-sampler with a factor of $K_i$ to a low rate $$\frac{M}{K_i} R_s$$

that is slightly larger than the Nyquist bandwidth. The down-sampler may comprise one of the down samplers 6201, 6202, . . . and 620m.

The carrier is filtered by a low complexity FIR filter with $N_i$ taps. $N_i$ is computed approximately as:

$$N_i = \frac{\frac{M}{K_i} R_s}{\Delta f_i} \frac{R}{22} \quad (11)$$

wherein $R_s$ is the input signal sampling rate of the composite signal x(t)

M is the interpolation factor in Block 100

$K_i$ is the decimation factor in Block 620, where i is an index $\Delta f_i$ is the required transition bandwidth of the $i^{th}$ carrier R is the required filter rejection sidelobe in dB.

The FIR filter may comprise one of carrier filters 6301, 6302, . . . and 630m.

After carrier filtering, the signals are then subject to an amplitude, phase, and time (APT) correction by an APT processor, such as one of blocks 6401, 6402, . . . and 640m. Each of the blocks 6401, 6402, . . . and 640m comprises a complex multiplier providing amplitude adjustment, a phase correction device, and a delay buffer providing time delay adjustment. The delay adjustment can be performed with a delay buffer at an up-sampler, such as 6501, 6502, . . . or 650m to output higher resolution signals. The outputs of the blocks 6401, 6402, . . . and 640m are respectively up-sampled to the rate $M \cdot R_s$ by up samplers 6501, 6502, . . . and 650m, and are then respectively frequency shifted by frequency shifters 6601, 6602, . . . and 660m back to the desired frequency $f_i$. The required NCOs at the front and back of the CFR filter are synchronized to avoid unwanted time and phase offsets. After converting to the correct frequencies, a sub-band combiner 680B recombines the carriers outputs by frequency shifters 6601, 6602, . . . and 660m to create the desired signals that have the inter-modulation energy outside of the required signal bands reduced.

Block 700 Compute Output Amplitude.

Another absolute value processor 700 computes the amplitude b(t) of the output signal u(t)

$$b(t)=|u(t)|=\sqrt{I_u(t)^2+Q_u(t)^2} \quad (12)$$

The $I_u(t)$ and $Q_u(t)$ are respectively the I and Q components of the signal u(t).

Block 800 Gain Correction.

Figure 11:
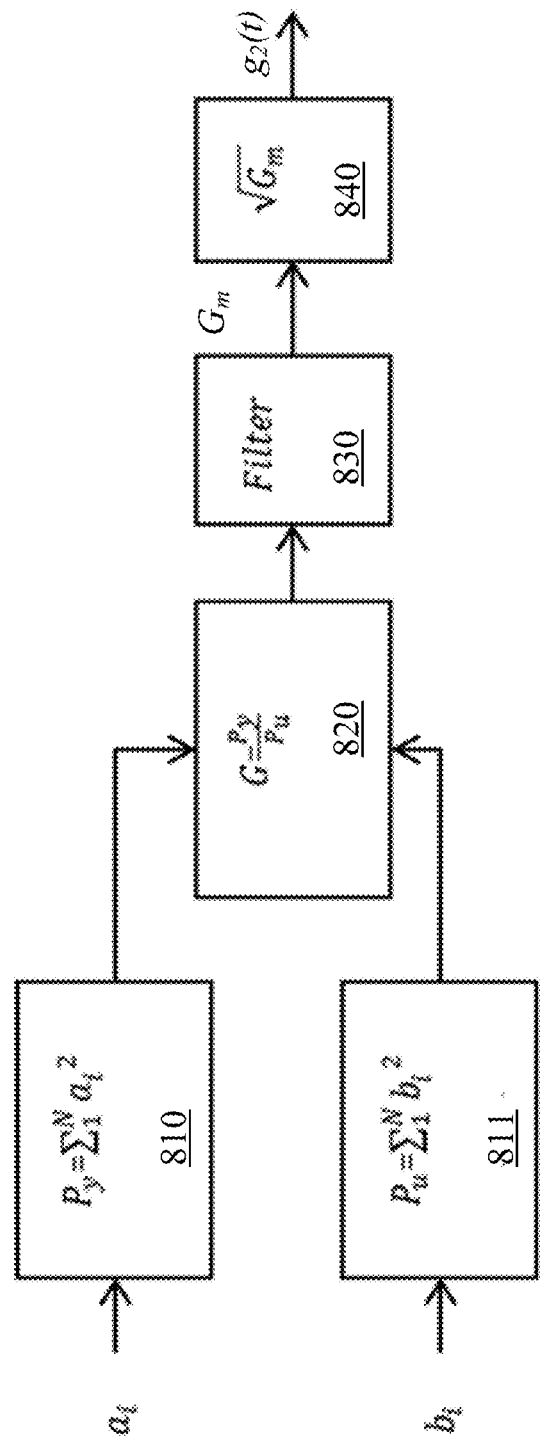
FIG. 11. is a schematic diagram showing one embodiment of gain correction processing to produce the gain correction factor $g_2(t)$.

A gain correction unit 800 produces the compensation gain correction to maintain a constant power gain through the CFR processor 12. The peak amplitude compression by the multipliers 500 produces a power reduction of the signal y(t). The gain correction unit 800 produces gain correction factor $g_2(t)$ to adjust the average power of the output signal u(t) to be substantially the same as that of the input signal y(t). The process of this function is shown in FIG. 11.

The process starts by an integration and dump (ID) unit 810 computing the square of the amplitude $a_i^2$, and an integration and dump (ID) unit 811 computing $b_i^2$. The ID unit 810 obtains a sum of the squared amplitudes $P_y=\Sigma_1^N a_i^2$ over N samples, and the ID unit 811 obtains a sum of the squared amplitudes $P_u=\Sigma_1^N b_i^2$ over N samples. The ID units 810 and 811 then feed the $P_y$ and $P_u$ to a divider 820 to compute the short term power ratio $$G = \frac{P_y}{P_u}.$$

The short term power ratios are then passed through a filter 830, such as a filter of ID, infinite impulse response (IIR), or finite impulse response (FIR), to compute the average power ratio $G_m$. Finally, a square root unit 840 obtains the square root of the power ratio $G_m$ to determine the gain correction factor $g_2(t)$.

The gain correction factor $g_2(t)$ is multiplied with the compression gain $g_1(t)$ to produce the instantaneous amplitude gain g(t).

Figure 12:
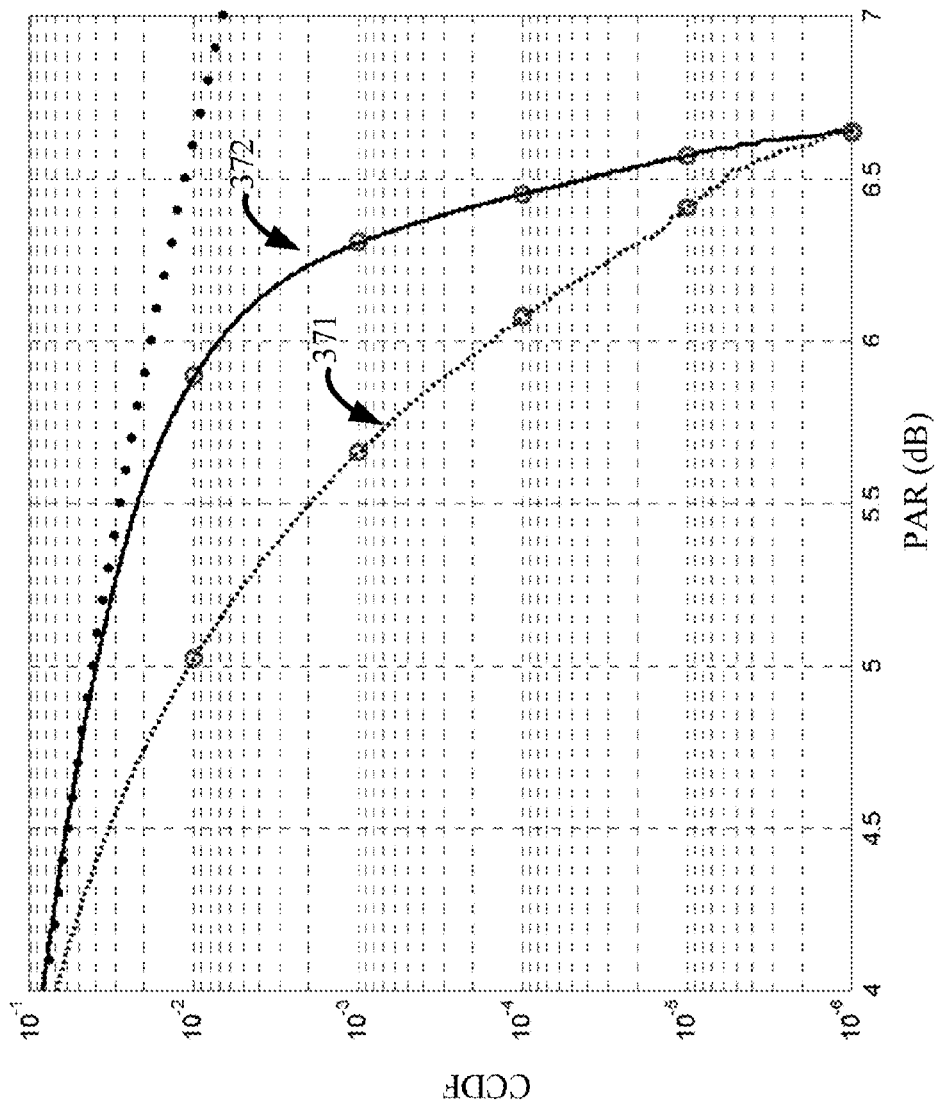
FIG. 12 shows the complementary cumulative distribution function (CCDF) of output signals of CFR processors utilizing an amplitude compression CFR method and an amplitude clipping CFR method.

FIG. 12 shows the CCDF of the output of a CFR processor using the amplitude compression CFR method in comparison with output of the amplitude clipping CFR method. PAR4 and PAR6 denote the PAR at CCDF=$10^{-4}$ and CCDF=$10^{-6}$ respectively. A curve 371 represents the CCDF of output signals of a CFR processor using the amplitude clipping CFR method with respect to PAR of input signals of the CFR processor. A curve 372 represents the CCDF of output signals of a CFR processor using the amplitude compression CFR method with respect to PAR of input signals of the CFR processor. The FIG. 12 shows the CCDF curves from PAR=4 to PAR=6. The curve 371 and curve 372 both have PAR6=6.65 dB, but clearly the PAR spread defined by (PAR6-PAR4) of the amplitude clipping is substantially larger compared to the PAR spread defined by (PAR6-PAR4) of the amplitude compression.

Figure 15:
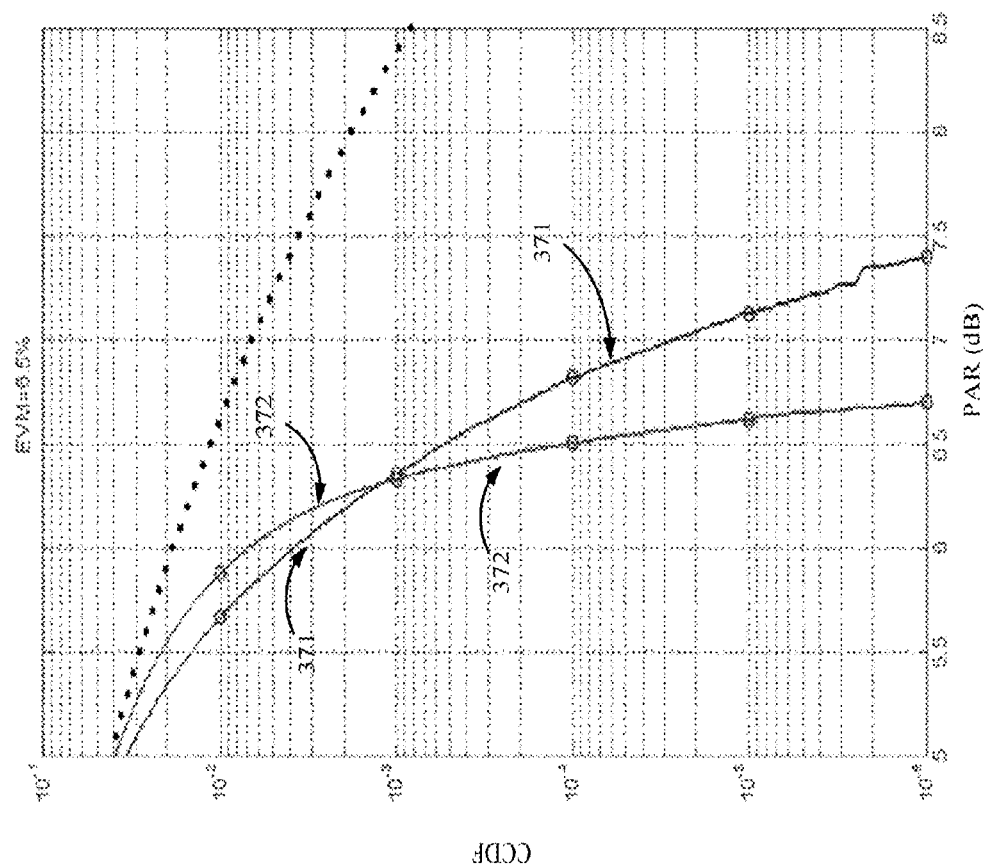
FIG. 15 shows the CCDF of output signals of CFR processors utilizing an amplitude compression CFR method and an amplitude clipping CFR method for error vector magnitude (EVM) of 6.5% and SNR=23.74 dB.

As shown in FIG. 15, some of the distortion from peak amplitude compression is located outside the desired signal band and will be filtered out. As observed from an experiment under a given condition, in-band distortion energy density obtained from amplitude compression and amplitude clipping are respectively 23.66 dB and 19.67 dB. The amplitude compression technique has an in-band distortion energy density which is 4 dB less than that of the amplitude clipping technique. The following Table 4 shows performance comparisons between amplitude compression and amplitude clipping methods for the same PAR6=6.65 dB at CCDF=$10^{-6}$.

TABLE 4

|      | Amplitude Compression | Amplitude Clipping | Delta |
|------|-----------------------|--------------------|-------|
| PAR4 | 6.46                  | 6.08               | −0.38 dB |
| PAR6 | 6.65                  | 6.65               | 0 dB  |
| SNR  | 23.67                 | 19.67              | 4 dB  |

Note that for the same peak PAR6, the amplitude compression technique has a higher SNR compared to the amplitude clipping technique.

Figure 13:
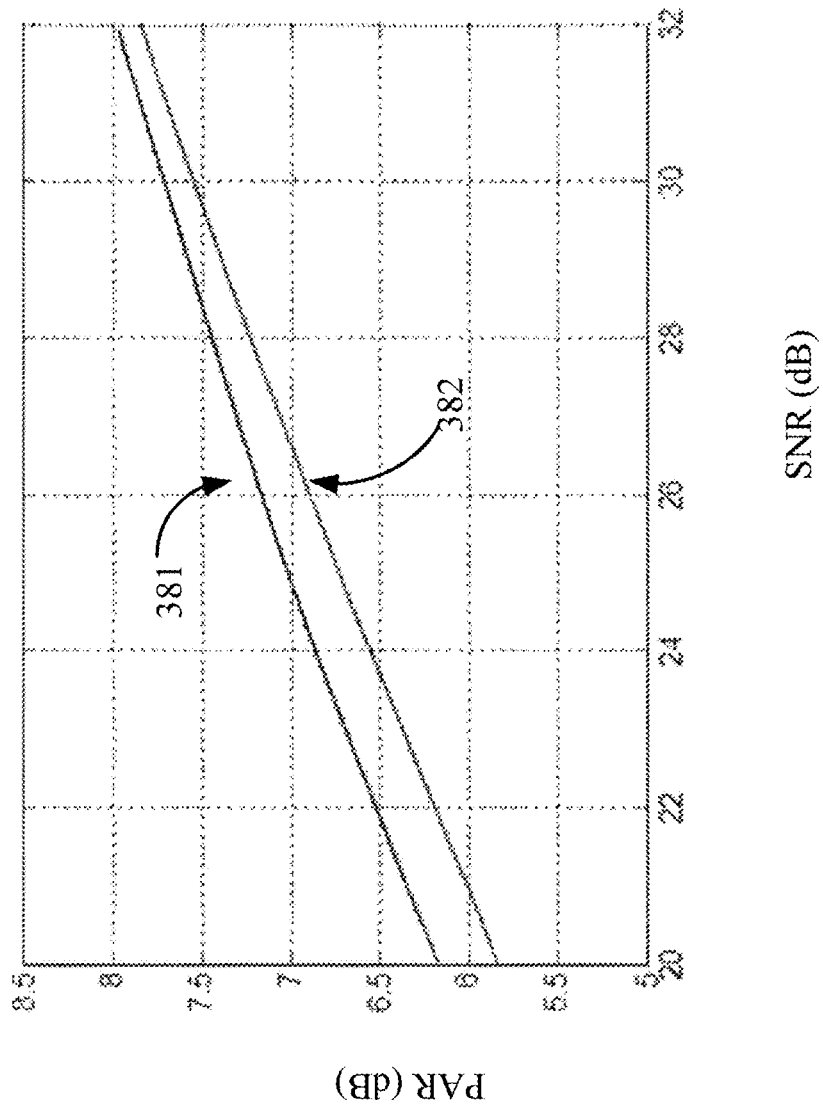
FIG. 13 is a schematic diagram showing the performance of CFR processors respectively utilizing an amplitude compression CFR method and an amplitude clipping CFR method under a condition wherein PAR is at $10^{-4}$ with respect to SNR.

Referring to FIG. 13, for the same EVM of 6.5%, a curve 382 represents PAR of output signals of the amplitude compression method with respect to the SNR, and a curve 381 represents PAR of output signals of the amplitude clipping method with respect to the SNR. With the same EVM, the PAR4 of the amplitude compression method is about 0.32 dB lower than the PAR4 of the amplitude clipping method at CCDF=$10^{-4}$.

Figure 14:
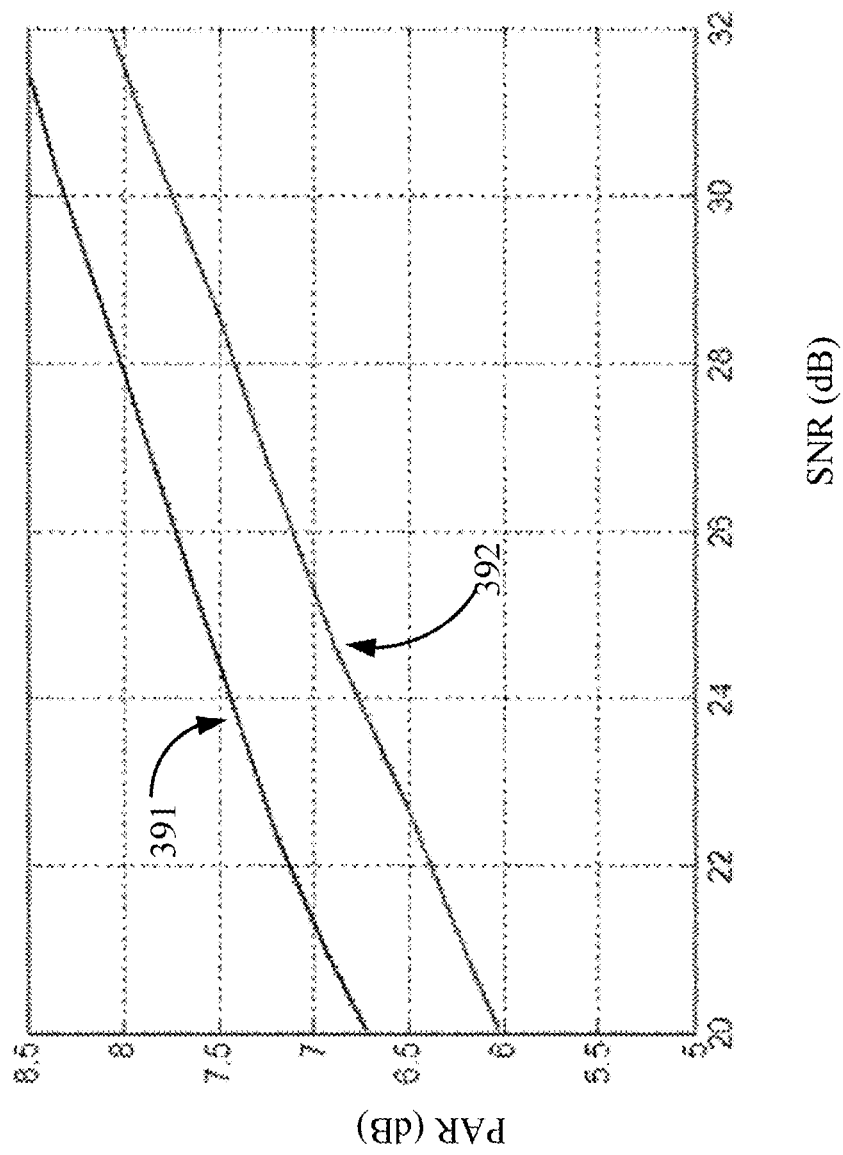
FIG. 14. is a schematic diagram showing the performance of CFR processors utilizing an amplitude compression CFR method and an amplitude clipping CFR method under a condition in which PAR is at $10^{-6}$ with respect to SNR.

Referring to FIG. 14, for the same EVM of 6.5%, a curve 392 represents PAR of output signals of the amplitude compression method with respect to the SNR, and a curve 391 represents PAR of output signals of the amplitude clipping method with respect to the SNR. The PAR6 of the amplitude compression can be as much as 0.75 dB lower than PAR6 of the amplitude clipping method. A substantial reduction in amplitude peaks is obtained from the amplitude compression method at CCDF=$10^{-4}$.

The foregoing disclosure of various embodiments has been presented for purposes of illustration and description. It is not intended to be exhaustive or to limit the disclosure to the precise forms disclosed. Many variations and modifications of the embodiments described herein will be apparent to one of ordinary skill in the art in light of the above disclosure. The scope of the disclosure is to be defined only by the claims appended hereto and their equivalents.

What is claimed is:

1. A method of crest factor reduction (CFR) using amplitude compression, executable by a communication device, the method comprising:
   receiving a complex input signal x(t) at a first sampling rate $R_s$;
   up-sampling the complex input signal x(t) to a second sampling rate $M \cdot R_s$ that is larger than an instantaneous bandwidth of the complex input signal x(t), to generate an up-sampled complex signal y(t);
   computing an amplitude signal a(t) representing an amplitude of the up-sampled signal y(t) and sending the amplitude signal a(t) to an amplitude compressor of the communication device to extract the compressed gain $g_1(t)$;
   multiplying the gain $g_1(t)$ with a correction gain $g_2(t)$ to obtain a final gain signal g(t);
   performing amplitude compression of the up-sampled complex signal y(t) by multiplying the gain signal g(t) with the up-sampled complex signal y(t) to produce the amplitude compressed signal z(t);
   performing signal filtering by the filter of the communication device on the amplitude compressed signal z(t) to generate a post-CFR signal u(t), wherein the post-CFR signal u(t) is at a higher sampling rate and with a lower peak to average (PAR) ratio than the complex input signal x(t).

2. The method as claimed in clam 1, further comprising:
assigning the compressed gain $g_1(t)$ a value substantially equal to an identity element of an operation of the step of multiplying if $0<a(t)<T1$;
assigning the compressed gain $g_1(t)$ a value substantially equal to $T1/a(t)$ if $T1<a(t)<T2$; and
assigning the compressed gain $g_1(t)$ a value less than $T1/a(t)$ if $T2<a(t)$, wherein $T1$ and $T2$ are two amplitude threshold values of the amplitude signal.

3. The method as claimed in claim 1, wherein in obtaining the gain $g_2(t)$, the method further comprises:
computing amplitude $b(t)$ of the post-CFR signal $u(t)$;
obtaining sample N points $b_1$, $b_2$, to $b_N$ of the amplitude $b(t)$;
obtaining sample N points $a_1$, $a_2$ to $a_N$ of the amplitude $a(t)$;
obtaining short term power ratio G, wherein $$G = \frac{P_y}{P_u}, P_y = \sum_{i=1}^{N} a_i^2, P_u = \sum_{i=1}^{N} b_i^2,$$

and i is a integer variable ranging from 1 to N;
obtaining an average power ratio $G_m$ from the short term power ratio G; and
determining the correction gain $g_2(t)$ based on square root of the average power ratio $G_m$.

4. The method as claimed in claim 1, wherein the second sampling rate $M \cdot R_s$ is substantially M times larger than the instantaneous bandwidth of the complex input signal $x(t)$, and the M is an integer ranging from two to four.

5. The method as claimed in claim 1, wherein the correction gain $g_2(t)$ is utilized to compensate for resulting gain error which occurs in the amplitude compression of the up-sampled complex signal $y(t)$.

6. The method as claimed in claim 1, wherein the filter comprises a CFR filter operable to suppress the undesired inter-modulation distortion outside fundamental carriers of the amplitude compressed signal $z(t)$.

7. A wireless communication device, comprising:
an up-sampling stage operable to receive a complex input signal $x(t)$ at a first sampling rate $R_s$ and up-sample the complex input signal $x(t)$ to a second sampling rate $M \cdot R_s$ that is larger than an instantaneous bandwidth of the complex input signal $x(t)$, to generate an up-sampled complex signal $y(t)$;
a first amplitude computing stage operable to compute an amplitude signal $a(t)$ representing an amplitude of the up-sampled signal $y(t)$ and sending the amplitude signal $a(t)$ to an amplitude compressor of the communication device to extract the compressed gain $g_1(t)$;
a first multiplier operable to multiply the gain $g_1(t)$ with a correction gain $g_2(t)$ to obtain a final gain signal $g(t)$;
a second multiplier operable to performing amplitude compression of the up-sampled complex signal $y(t)$ by multiplying the gain signal $g(t)$ with the up-sampled complex signal $y(t)$ to produce the amplitude compressed signal $z(t)$;
a filter operable to perform signal filtering on the amplitude compressed signal $z(t)$ to generate a post-CFR signal $u(t)$, wherein the post-CFR signal $u(t)$ is at a higher sampling rate and with a lower peak to average (PAR) ratio than the complex input signal $x(t)$.

8. The wireless communication device as claimed in claim 7, further comprising an amplitude compression stage operable to execute a dynamic amplitude compression process comprising steps of:
assigning the compressed gain $g_1(t)$ a value substantially equal to an identity element of the step of multiplying if $0<a(t)<T1$;
assigning the compressed gain $g_1(t)$ a value substantially equal to $T1/a(t)$ if $T1<a(t)<T2$; and
assigning the compressed gain $g_1(t)$ a value less than $T1/a(t)$ if $T2<a(t)$, wherein $T1$ and $T2$ are two amplitude threshold values of the amplitude signal.

9. The wireless communication device as claimed in clam 7, wherein in obtaining the gain $g_2(t)$, the method further comprises:
a first amplitude computing stage operable to compute an amplitude $b(t)$ of the post-CFR signal $u(t)$; and
a gain correction stage operable to execute a gain correction process comprising:
obtaining sample N points $b_1$, $b_2$, to $b_N$ of the amplitude $b(t)$;
obtaining sample N points $a_1$, $a_2$ to $a_N$ of the amplitude $a(t)$;
obtaining short term power ratio G, wherein and $$G = \frac{P_y}{P_u}, P_y = \sum_{i=1}^{N} a_i^2,$$

$P_u = \sum_{i=1}^{N} b_i^2$, and i is a integer variable ranging from 1 to N;
obtaining an average power ratio $G_m$ from the short term power ratio G; and
determining the correction gain $g_2(t)$ based on square root of the average power ratio $G_m$.

10. The wireless communication device as claimed in claim 7, wherein the second sampling rate $M \cdot R_s$ is substantially M times larger than the instantaneous bandwidth of the complex input signal $x(t)$, and the M is an integer ranging from two to four.

11. The wireless communication device as claimed in claim 7, wherein the correction gain $g_2(t)$ is utilized to compensate for resulting gain error which occurs in the amplitude compression of the up-sampled complex signal $y(t)$.

12. The wireless communication device as claimed in claim 7, wherein the filter comprises a CFR filter operable to suppress the undesired inter-modulation distortion outside fundamental carriers of the amplitude compressed signal $z(t)$.

\* \* \* \* \*